United States Patent Office 3,341,404
Patented Sept. 12, 1967

3,341,404
METHOD OF KILLING INSECTS WITH 5,6,7,8-TETRAHYDRO - 1 - NAPHTHYL-N-METHYL CARBAMATE
Joseph A. Lambrech, deceased, late of Charleston, W. Va., by Vallah G. Lambrech, executrix, Charleston, W. Va., assignor to Union Carbide Corporation, New York, N.Y., a corporation of New York
No Drawing. Application June 26, 1962, Ser. No. 205,466, which is a division of application Ser. No. 531,274, Aug. 29, 1955. Divided and this application Mar. 31, 1966, Ser. No. 560,991
1 Claim. (Cl. 167—30)

This is a division of application Ser. No. 205,466, filed June 26, 1962, which is a division of Ser. No. 531,274, filed Aug. 29, 1955, now abandoned.

This invention relates to new chemical compounds and to insecticidal compositions containing them. More particularly, the present invention relates to certain 5,6,7,8-tetra hydro-1-naphthyl esters of carbamic acids and to insecticidal compositions containing the same.

The compounds of this invention can be represented by the general formula (I)

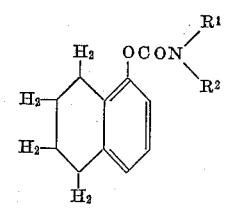

wherein $R^1$ and $R^2$ are individually selected from the class consisting of hydrogen and lower alkyl, with the proviso that the total number of carbon atoms in $R^1$ and $R^2$ does not exceed 7. Compounds wherein one of $R^1$ and $R^2$ is hydrogen are generally superior in insecticidal activity and, hence, preferred.

Exemplary of compounds represented by Formula I are 5,6,7,8-tetrahydro-1-naphthyl carbamate, 5,6,7,8-tetrahydro-1-naphthyl N-methyl carbamate, 5,6,7,8-tetrahydro-1-naphthyl N,N-dimethyl carbamate, 5,6,7,8-tetrahydro-1-naphthyl N-ethyl carbamate, 5,6,7,8-tetrahydro-1-naphthyl N-ethyl N-methyl carbamate 5,6,7,8-tetrahydro-1-naphthyl N-n-propyl carbamate, 5,6,7,8-tetrahydro-1-naphthyl N-n-propyl N-methyl carbamate, 5,6,7,8-tetrahydro-1-naphthyl N - isopropyl carbamate, 5,6,7,8-tetrahydro-1-naphthyl N-isopropyl N-methyl carbamate, 5,6,7,8-tetrahydro-1-naphthyl N-n-butyl carbamate, 5,6,7,8-tetrahydro-1-naphthyl N-n-butyl N-methyl carbamate, 5,6,7,8-tetrahydro-1-naphthyl N-isobutyl carbamate, 5,6,7,8 - tetrahydro - 1-naphthyl N-isobutyl N-methyl carbamate, 5,6,7,8-tetrahydro-1-naphthyl N-pentyl carbamate, 5,6,7,8-tetrahydro-1-naphthyl N - pentyl N-methyl carbamate, 5,6,7,8-tetrahydro-1-naphthyl N-hexyl carbamate, 5,6,7,8-tetrahydro-1-naphthyl N-hexyl N-methyl carbamate, and the like.

The compounds of this invention may be prepared, generally, by reacting 5,6,7,8-tetrahydro-1-naphthol with phosgene to form the corresponding chloroformate and reacting the chloroformate with a primary or secondary amine to form the corresponding carbamate and HCl. If desired, the sodium salt of the 5,6,7,8-tetrahydro-1-naphthol may be used in place of said compound, in which case NaCl instead of HCl is the reaction product. In the formation of chloroformate, the phosgene is dissolved in toluene or benzene, or other suitable organic solvent, and then added to the water solution of the hydroxy compound or its sodium salt at a temperature of from about —30° C. to 20° C. The reaction is slightly exothermic so that some external cooling is usually necessary. The chloroformate separates in the organic phase which is separated from the aqueous phase carrying the hydrogen or sodium chloride. The chloroformate may then either be isolated by distillation or used without further purification.

The reaction involving the addition of the chloroformate to the amine is carried out in the presence of solvents for the amine such as water or dioxane. The reaction temperature is preferably in the range from 10° C. to 50° C. Below 10° C. the reaction proceeds but the rate is too slow and above 50° C. the reaction rate is so rapid that loss of low boiling amines may occur and some decomposition may take place.

The above-described reactions may be represented graphically by the following general equations:

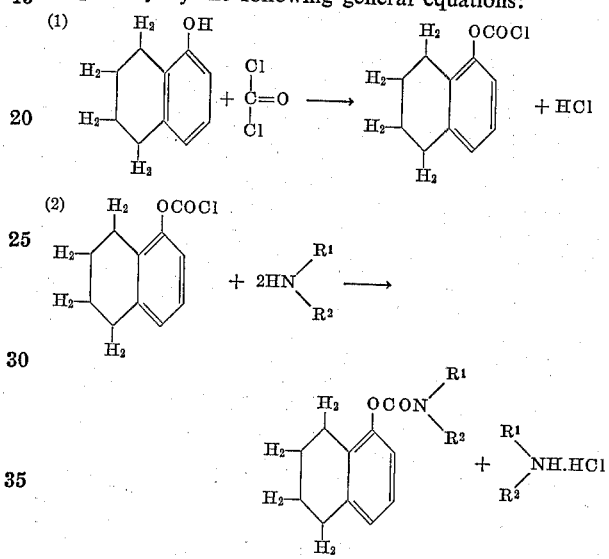

The following example is illustrative.

EXAMPLE I

*Preparation of 5,6,7,8-tetrahydro-1-naphthyl N-methyl carbamate*

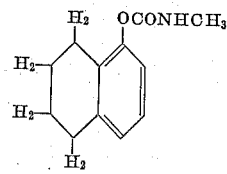

Following the general procedure, 5,6,7,8-tetrahydro-1-naphthyl chloroformate was prepared by the reaction of sodium naphthoxide and phosgene. A mixture of 148 parts of 5,6,7,8-tetrahydro-1-naphthol, 54 parts sodium methoxide, and 500 parts toluene was heated at its boiling point until 32 parts methanol was obtained. The mixture cooled to 20° C. and a mixture of 140 parts phosgene and 200 parts toluene then added dropwise. After the addition of the phosgene the reaction mixture was agitated for one hour at 20° C., filtered and distilled. 5,6,7,8-tetrahydro-1-naphthyl chloroformate boils at 88° C. to 95° C. at 3 mm. Hg.

5,6,7,8-tetrahydro-1-naphthyl N-methyl carbamate was prepared by slowly adding 107 parts of tetrahydro-1-naphthyl chloroformate to a mixture of 46 parts methylamine and 400 parts dioxane at 20° C. After the addition of the 5,6,7,8-tetrahydro-1-naphthyl chloroformate the reaction mixture was agitated at 40° C. for one hour. The mixture was cooled to 20° C. and the N-methylamine hydrochloride was removed by filtration. The dioxane was then removed by distillation and the 5,6,7,8-tetrahydro-1- naphthyl N-methyl carbamate distilled. 5,6,7,8-tetrahydro-1-naphthyl N-methyl carbamate boils at 150° C. to 155° C. at 2 mm. Hg and is insoluble in water.

The compounds of this invention are useful as insecticides and many of them are more potent than rotenone in insecticidal activity. They are stable in the presence of light and air and in the presence of alkaline materials and are thus superior to rotenone, which is oxidized on exposure to air, the oxidation being catalyzed by light and by alkalies, for instance nicotine, lime, lime-sulfur, Bordeaux mixture and alkaline materials which are used as dust diluents.

As an illustrative embodiment of this invention 5,6,7,8-tetrahydro-1-naphthyl N-methyl carbamate, prepared as disclosed in Example I, above, was evaluated with regard to insecticidal activity.

In testing the chemical against insects, Mexican bean beetle larvae (*Epilachna varivestic* Muls.) were chosen as representative test insects and tender green bean plants as representative test plants. An aqueous suspension of the chemical was prepared at the rate of 0.25 gram of chemical dissolved in 10 milliliters (10 percent of the final volume of the suspension) of acetone in which was dissolved 0.025 g. (10 percent of the weight of the chemical) of a non-ionic wetting and emulsifying agent which solution was diluted with sufficient water to give 100 ml. of the suspension upon agitation. The specific emulsifier used was "Tergitol Dispersant NPX" a proprietary non-ionic alkyl phenyl polyethylene glycol ether. The suspension thus prepared and containing 0.25 percent of chemical were sprayed on the bean plants to run-off, the plants being on a revolving turn-table so that all parts of the plants were sprayed. After the plants were dry (about one hour after spraying) each plant was infested with a given number of fourth instar Mexican bean beetle larvae and then the leafy portion of the plant and the larvae were enclosed in a spherical wire mesh cage; and 72 hours after the infestation observations were made of the damage to foliage by the feeding larvae. The compound tested received a rating of A, showing that it provided excellent control of the insect, i.e. little or no feeding.

Tests were also conducted on bean aphid (*Aphis rumicis*), using 5,6,7,8-tetrahydro-1-naphthyl N-methyl carbamate. For the bean aphid test nasturtium plants growing in small clay pots were infested with about 100 to 150 aphids, and then sprayed in the manner previously stated with spray compositions containing 0.25 gram of the test compound, 10 milliliters of acetone, 0.025 gram of "Tergitol Dispersant NPX" and water to 100 milliliters. After spraying, the plants were placed on their sides in a Petri dish on a piece of white paper which had previously been ruled into squares to facilitate counting. The paper was ringed with tanglefoot glue to prevent the test insects from escaping. Counts of the insects which fell to the paper and those left on the plant were made 24 hours after the spray application. The compound received a rating of A, indicating that it provided excellent control.

In making the aforedescribed tests it was noted that the sprays were not phytotoxic to the plants at the concentrations of chemical used.

The toxicants or insecticides contemplated herein, i.e. the compounds of this invention, are not deleteriously affected by suitable adjuvants and additives, for instance blood albumin or skimmed milk, nor are the phytotoxic properties of the toxicants affected by such agents; and, as distinguished from rotenone, the properties of the toxicants contemplated herein are not affected by alkaline spray materials such as nicotine, hydrated lime, lime-sulfur, Bordeaux mixture nor alkaline dust extenders with all of which materials the toxicants contemplated herein have been found to be compatible. However, the toxicants are preferably not applied to plants in solution in non-volatile solvents, for instance, oils of the type which are, of themselves, phytotoxic although such oil solutions may be used in treating paper, cardboard and the like.

It is a feature of the invention that the toxicants contemplated herein are so chemically inert that they do not react with the various agents nor do they react chemically with the foliage or other parts of the plant or seed, either with or without the additive agents, in a deleterious manner.

For application to those parts of the plant which are above ground, the toxicants are preferably applied as water base sprays, the sprays containing the toxicants in finely divided condition, this condition easily being obtained by mixing a solution of the toxicant in a water soluble solvent, for instance acetone, into a larger volume of water whereupon the toxicants are thrown out of solution in the finely divided substantially colloidal condition, In the final spray, the acetone is present in only minute amount and that amount quickly volatilizes as the spray dries. Where the toxicants are used as insecticides in grain or seed treatments, they may be applied to the grain or seeds as a dust, preferably with an adhesive adjuvant, merely being tumbled with the seeds or grain. To obtain a dust, either a concentrate or a dilute composition having the toxicant in extremely finely divided form, or a solution of the toxicant in a volatile solvent, may be mixed into a particulate extender, for instance talc or an adhesive adjuvant, and then dried. The volatilization of the solvent deposits the toxicant on the extender in substantially colloidal sized particles. Regrinding may be necessary to obtain correct particle size. Aqueous spray compositions may also be prepared by grinding the toxicants in water to make a concentrated dispersion, or even with so little water as to make a paste which is then incorporated at the point of use with sufficient additional water to give a spray wherein the toxicant has the desired concentration. The concentrates, either in the form of solutions, concentrated aqueous suspensions, pastes or dusts, may contain such other components of the spray as are desirable, for instance nicotine sulfate or other insecticides or fungicides.

The concentrates from which the ultimate aqueous sprays or dusts are to be prepared preferably contain between 10 and 70 parts by weight of the toxicant with sufficient additional material either inert of active (for instance a contact insecticide or a fungicide) to make 100 parts by weight. The ultimate sprays or dusts are prepared by adding a convenient amount of additional material including inert materials and such addends, for instance nicotine sulfate or other insecticide or fungicide, as may be desired in the spray or dust schedule and as the agriculurist is in the habit of using, so that when the crop plants are thoroughly dusted or sprayed, the toxicants herein contemplated are applied at rates of from ⅓₂ to 50 lbs. of active toxicant. Whether the toxicants are applied in dust formulations or as aqueous sprays, they are preferably applied in finely divided form. Aqueous sprays prepared by mixing a solution of the toxicants into water are, in general, preferred as the toxicants precipitate in the water in substantially colloidal form and when such a slurry or suspension is applied to the plant the foliage of the plant is thoroughly but adequately covered with the toxicant and the minute particles of the toxicant firmly lodge in the irregularities of the plant surface so that the toxicant is not dislodged by rain nor the flexing of the plant by wind. Satisfactory sprays for general use contain from about ½ to 4 pounds of the toxicant to be applied per acre.

Emulsifying agents or suspending agents may be used if desired; in general if the spraying device has mechanism for continually agitating the spray compositions, little or no emulsifying agent need be used but where it is desired to maintain the toxicants in suspension for several hours without agitation a higher amount of emulsifying agent is desirable. The amount of emulsifying agent preferably runs from about 1 pound to 10 pounds per 100 pounds of toxicant but desirably as little emulsifying agent is used as is possible consistent with the desired emulsion characteristics of the spray, so that rain does not re-emulsify the toxicant after it is applied to the plant and wash it off of the plant.

For general use the toxicants are applied as homogeneous aqueous dispersions by the use of surface active agents. These agents cause the toxicants easily to be dispersed in water to give the aqueous sprays. The surface active agents employed may be anionic, cationic or non-ionic and include, for example, sulfonated animal, vegetable and petroleum oils, sodium lauryl sulfate glycerol monostearate, ethylene oxide condensation products with octyl phenol, lauryl pyridinium bromide and octyldimethylbenzyl ammonium chloride. The surface active agent can comprise from 1 percent to 15 percent by weight of the concentrate.

The insecticides contemplated herein prevent attack by insects upon plants or other material to which the insecticides are applied and they have high residual toxicity. With respect to plants they have a high margin of safety in that, when used in sufficient amount to kill or repel the insects, they do not burn or injure the plant and they resist weathering which includes wash-off caused by rain, decomposition by ultraviolet light, oxidation or hydrolysis in the presence of moisture or, at least, such decomposition, oxidation and hydrolysis as materially decrease the desirable insecticidal characteristics of the toxicants or impart undesirable characteristics, for instance phytotoxicity, to the toxicants. As previously stated the toxicants are so chemically inert that they are compatible with substantially any other constituents of the spray schedule. The low water solubility of the toxicants enable them to be used in the soil upon seeds or the roots of plants without injuring either the seeds, roots, or plants by inhibition or root-uptake and they have such low mammalian toxicity that when applied to either the foliage of a plant or the parts of a plant which are below the surface of the soil, for instance tubers and the like, either humans or animals consuming the plants are not injured although, with respect to insects, they kill where the insects inbibe them either through feed or, as in the case of the mosquito larvae, through inhibition from the environment.

Apart from the distinctive insecticidal properties of the materials herein disclosed, adapting them for agricultural use, the materials generally may be used as modifiers for resin manufacture and they may find applications in the pharmaceutical arts either as drugs, intermediates or as chemotherapeutants.

What is claimed is:

The method for killing insects which comprises applying to said insects an insecticidally effective amount of 5,6,7,8-tetrahydro-1-naphthyl N-methyl carbamate.

References Cited

UNITED STATES PATENTS

| | | | |
|---|---|---|---|
| 2,776,197 | 1/1957 | Gysin et al. | 260—479 X |
| 2,946,719 | 7/1960 | Jones et al. | 260—479 |
| 3,081,340 | 3/1963 | Kilsheimer et al. | 260—479 |
| 3,165,442 | 1/1965 | Kilsheimer et al. | 167—30 X |

ALBERT T. MEYERS, *Primary Examiner.*

SAM ROSEN, *Examiner.*

DALE R. MAHANAND, *Assistant Examiner.*